United States Patent
Sonnek et al.

(10) Patent No.: US 11,509,500 B2
(45) Date of Patent: Nov. 22, 2022

(54) METHOD FOR TRANSMITTING AT LEAST ONE CONTROL COMMAND, AND CONTROL DEVICE

(71) Applicant: Webasto SE, Stockdorf (DE)

(72) Inventors: Sebastian Sonnek, Stockdorf (DE); Markus Geissler, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 242 days.

(21) Appl. No.: 16/611,362

(22) PCT Filed: May 4, 2018

(86) PCT No.: PCT/EP2018/061556
§ 371 (c)(1),
(2) Date: Nov. 6, 2019

(87) PCT Pub. No.: WO2018/206444
PCT Pub. Date: Nov. 15, 2018

(65) Prior Publication Data
US 2020/0382339 A1 Dec. 3, 2020

(30) Foreign Application Priority Data
May 8, 2017 (DE) ................... 10 2017 109 865.8

(51) Int. Cl.
*H04L 12/40* (2006.01)
*H04L 12/46* (2006.01)
*B60R 16/023* (2006.01)

(52) U.S. Cl.
CPC ...... *H04L 12/40169* (2013.01); *B60R 16/023* (2013.01); *H04L 12/40013* (2013.01); *H04L 12/4625* (2013.01); *H04L 2012/40273* (2013.01)

(58) Field of Classification Search
CPC ......... H04L 12/40169; H04L 12/40013; H04L 12/4625; H04L 2012/40273; B60R 16/023
See application file for complete search history.

(56) References Cited

U.S. PATENT DOCUMENTS

| 10,386,832 B2 * | 8/2019 | Maier ................ G05B 23/0286 |
| 10,457,116 B2 * | 10/2019 | Kliem ................ B60H 1/00828 |
| 2005/0240706 A1 * | 10/2005 | Tsai .................... G06F 13/4059 |
| | | 710/306 |
| 2009/0281673 A1 | 11/2009 | Taft |

(Continued)

FOREIGN PATENT DOCUMENTS

| CN | 102957587 A | 3/2013 |
| DE | 10163393 A1 | 7/2003 |

(Continued)

OTHER PUBLICATIONS

The State Intellectual Property Office of People's Republic of China, First Office Action and Search Report, Application No. 201880030572.0, dated Apr. 27, 2021, 20 pages.

(Continued)

*Primary Examiner* — Rasheed Gidado
(74) *Attorney, Agent, or Firm* — Quarles & Brady LLP

(57) ABSTRACT

The disclosure relates to a method for transmitting at least one control command to at least one actuator, comprising the following steps:
a) monitoring a communication bus;
b) detecting an event, for example bus inactivity, that lasts longer than a predefined time interval;
c) dividing the communication bus into a first bus segment and a second bus segment, wherein the actuator is part of the second bus segment;

(Continued)

d) transmitting the at least one control command to the at least one actuator on the second bus segment.

16 Claims, 3 Drawing Sheets

(56) References Cited

U.S. PATENT DOCUMENTS

| | | | |
|---|---|---|---|
| 2010/0241776 A1 | 9/2010 | Bayerl et al. | |
| 2013/0051435 A1* | 2/2013 | Van de Maele | H04L 12/40169 375/211 |
| 2014/0150090 A1* | 5/2014 | Cicala | G06F 21/44 726/19 |
| 2017/0098564 A1* | 4/2017 | Pape | G01K 7/00 |
| 2018/0026963 A1* | 1/2018 | Ning | H04W 12/043 713/159 |
| 2018/0204011 A1* | 7/2018 | Nakano | B60R 16/02 |

FOREIGN PATENT DOCUMENTS

| | | |
|---|---|---|
| DE | 102012214849 A1 | 2/2013 |
| DE | 102014210023 B4 | 6/2016 |
| RU | 251878 C2 | 6/2014 |
| WO | 0018064 A2 | 3/2000 |
| WO | 2015067504 A1 | 5/2015 |

OTHER PUBLICATIONS

PCT International Search Report and Written Opinion, PCT/EP2018/061556, dated Jul. 3, 2018, 20 pages.
German Patent and Trademark Office, Office Action, Application No. 102017109865.8, 9 pages.
Russian Federal Service for Intellectual Property, Search Report, Application No. 2019139957/28, dated May 18, 2020, 2 pages.
Russian Federal Service for Intellectual Property, Office Action, Application No. 2019139957/28, dated Jun. 10, 2020, 8 pages.
German Patent and Trademark Office, Office Action, Application No. 102017109865.8, dated Mar. 13, 2018, 9 pages.

* cited by examiner

METHOD FOR TRANSMITTING AT LEAST ONE CONTROL COMMAND, AND CONTROL DEVICE

CROSS-REFERENCE TO RELATED APPLICATIONS

This application represents the national stage entry of PCT International Patent Application No. PCT/EP2018/061556 filed on May 4, 2018 and claims priority to German Patent Application No. DE 10 2017 109 865.8 filed May 8, 2017. The contents of each of these applications are hereby incorporated by reference as if set forth in their entirety herein.

DESCRIPTION

The disclosure relates to a method for transmitting at least one control command and to a control device.

DE 10 2014 210 023 B4 discloses a manipulation unit for a vehicle. Corresponding manipulation units are used for example in vehicles in which an stationary heating is retrospectively installed. A fundamental problem with retrofitting stationary heating is that dedicated actuators, blowers and ventilation outlets or ventilation flaps are often not installed for air circulation. In one embodiment, the retrofitted heater is installed in the existing heating circuit of the vehicle. In order for example to allow the interior to be heated in the parked state of the vehicle, it is necessary to activate the actuators, for example ventilation flaps and fans, or to put them into a position that allows air circulation.

In modern vehicles, bus systems are used to establish communication for example between the air conditioning control component and the actuators, for example fans and ventilation flaps. In this connection, DE 10 2014 210 023 B4 proposes monitoring the vehicle bus in order to establish when the vehicle is switched off (ignition=off). When the user wishes to activate the stationary heating in this state, the manipulation unit interrupts an existing bus connection and uses this in order to communicate with the actuators.

The described prior art is problematic in many respects. The use of the stationary heating is thus restricted. Furthermore, the described manipulation unit is sometimes not able to respond to a change of state of the vehicle (ignition=on) quickly enough for the bus not to notice the manipulation. In this respect, the use of the manipulation device leads to faults.

Starting from this prior art, the object of the present disclosure is to specify an improved method for transmitting at least one control command to at least one actuator. A correspondingly improved control unit is also intended to be specified.

The occurrence of negative influences, for example communication faults, is in particular intended to be avoided.

The object is achieved by a method according to claim 1.

The object is achieved in particular by a method for transmitting at least one control command to at least one actuator of a vehicle, which method comprises the following steps:

a) monitoring a communication bus;
b) detecting an event, for example bus inactivity, that lasts longer than a predefined time interval;
c) dividing the communication bus into a first bus segment and a second bus segment, wherein the actuator is part of the second bus segment;
d) transmitting the at least one control command to the at least one actuator on the second bus segment.

One key concept of the present disclosure is that the communication bus to be interrupted, for example a CAN bus or a LIN bus, is monitored. Depending on the embodiment of the disclosure, a particular event, for example lack of communication on the bus (=bus inactivity), is able to be detected by virtue of the monitoring. The communication bus is able to be divided or interrupted on the basis of the detection of this event. A corresponding division may be performed for example by using a relay. In one embodiment, in a split or division according to the disclosure, electrical connections between individual lines of the bus are interrupted. Following the division of the bus, an actuator is able to be addressed by way of a control command without components on the first bus segment becoming aware of this.

By virtue of the described approach, negative influences on the communication bus and/or components connected thereto are able to be avoided. Numerous applications in which it is possible to intervene essentially flexibly in the control algorithms are furthermore conceivable. It is conceivable for example to intervene in the communication on the communication bus in only very brief time intervals. As an alternative, it is likewise possible to intervene in the communication only when this is absolutely necessary (blower is not working or flaps are situated in an incorrect position).

By virtue of preferably continuously monitoring the communication bus or the communication lines, it is possible to wait for an optimum time to switch.

In one embodiment, following the division of the communication bus, in a forwarding phase, a control command is received on the first bus segment and output on the second bus segment. In this phase, a corresponding control unit acts as a repeater and simply repeats the received control commands on the respective other segment. According to the disclosure, it is also possible for this repeater function to be implemented in the opposite direction, from the second bus segment to the first bus segment. The interruption of the communication bus or the division into two bus segments is thus not perceived by the participants on the bus. This has the advantage that it is possible to intervene in the control algorithms of the actuators, possibly in a highly selective manner.

In one embodiment, following the division of the communication bus, in an absorption phase, at least one control command that is intended for the actuator is received and confirmed on the first bus segment, wherein there is however no output or repetition of the control command on the second bus segment. The method according to the disclosure is thus able to selectively or continuously absorb and not forward control commands in a second phase. In this respect, it is possible to absorb or to intercept hazardous control commands for the function to be implemented, for example heating the interior by way of an auxiliary heater. A corresponding hazardous command may for example be the deactivation of the ventilation or of the blower or the closure of the ventilation flap.

In one embodiment, the reception of the control command on the first bus segment is confirmed in the absorption phase, even though forwarding to the actuator has not taken place.

In one embodiment, following the division and transmission of the at least one control command, the first and second bus segment are reconnected. The at least one control command may in the meantime be transmitted multiple times or just once. It is theoretically also conceivable to divide and reconnect the communication bus multiple times within a heating phase. The communication bus is preferably interrupted over a relatively long phase, for example from the activation of the heater in the parked state of the vehicle until the actuation of the ignition, provided that heating is still intended to be performed at this time.

In one embodiment, the first and second bus segment are connected at a time that depends at least partly on an event on the first bus segment. According to the disclosure, findings that have been obtained by monitoring the communication bus are thus also able to be used when connecting the two bus segments. In one embodiment, the event may be bus inactivity that lasts beyond a predefined time interval. In one (other) embodiment, the event may be the activation of the air conditioning control component.

In one embodiment, the connection of the bus segments is preceded by a forwarding phase. A corresponding forwarding phase may be designed in a manner as has already been described above. According to the disclosure, this forwarding phase may directly or indirectly precede the connection.

The object mentioned at the outset is furthermore achieved by a computer-readable storage medium or a computer-readable memory, wherein the memory comprises instructions for execution on a processing unit. The instructions are preferably customized according to the disclosure such that they implement at least one of the methods described above when executed. This results in advantages similar to those already explained in connection with the described methods.

The object mentioned at the outset is furthermore achieved by a control unit that comprises a corresponding computer-readable medium or a corresponding computer-readable memory and a processing unit. In one embodiment, the control unit is a manipulation unit.

In one embodiment, the object mentioned at the outset is achieved by a control unit that comprises the following:
 a first transceiver for connection to a first bus segment of a vehicle;
 a second transceiver for connection to a second bus segment of the vehicle;
 a processing unit that is connected in terms of communication to the first and the second transceiver,
wherein the processing unit is designed to monitor communication on the first and/or second bus segment and to activate a switching device, in particular a relay, based on the monitoring, wherein the switching device is designed to establish an electrical connection between the first bus segment and the second bus segment or to interrupt the electrical connection between the bus segments.

The processing unit may be a microcontroller or dedicated hardware.

This also results in advantages similar to those already described. The existing transceivers may in particular be used to continuously or temporarily monitor the activity on the communication bus or on the first and/or second bus segment, such that the switching device is able to switch in a targeted manner in response to particular activities or events on the communication bus.

The switching device may be a simple relay. As an alternative, there may be an implementation by way of transistors. According to the disclosure, numerous implementation possibilities that implement the concept of at least partly physically dividing the communication bus are conceivable.

In one embodiment, the switching device is designed to establish the electrical connection between the first bus segment and the second bus segment in an unpowered state. This embodiment has the advantage that secure communication on the communication bus is possible in the event of a fault, for example with the switching device or with the control unit. The basic functionality of the vehicle, for example communication between air conditioning control component and actuators, is furthermore not influenced independently of the state of the control unit.

In one embodiment, the processing unit is designed, in a forwarding phase, to receive signals, in particular control commands, by way of the first transceiver and to output corresponding signals, in particular corresponding control commands, by way of the second transceiver. The processing unit thus uses both transceivers in order to implement a repeater function, as has already been described.

The control unit may comprise at least one first termination means, in particular one first terminating resistor. It is possible to connect this termination means, when the communication bus is divided, to the first and/or second bus segment such that the required termination of the individual bus segments is implemented in an efficient manner. In one embodiment, the control unit comprises a first termination means and a second termination means in order to terminate the first bus segment and the second bus segment.

In one embodiment, switches, for example normally open contacts or normally closed contacts, are provided, these being actuated by the control unit, in particular by the processing unit. These switches may be used to connect the termination means to the respective bus segment. In this respect, it is possible to provide a technically intact communication bus or technically intact bus segments at all times, independently of the switching state of the switching device. No communication faults occur. No faults may likewise be detected during a possible check of the bus.

The object mentioned at the outset is furthermore achieved by a system that comprises a heating device and a control unit as has been described above. In one embodiment, the control unit is connected in terms of communication to the heating device, in particular via a (further) bus.

In one embodiment, the state of the heating device is interrupted. The communication connection to the heating device may in particular be used to detect a heating phase of the heating device or to put the heating device into a heating phase, wherein the bus is interrupted depending on the state of the heating device.

The object mentioned at the outset may likewise be achieved by a vehicle comprising the system described above.

Further advantageous configurations emerge from the dependent claims.

The disclosure is described below with reference to a plurality of exemplary embodiments that are explained in more detail by way of drawings. In the figures.

In the following description, the same reference signs are used for identical and functionally identical parts.

Figure 1:
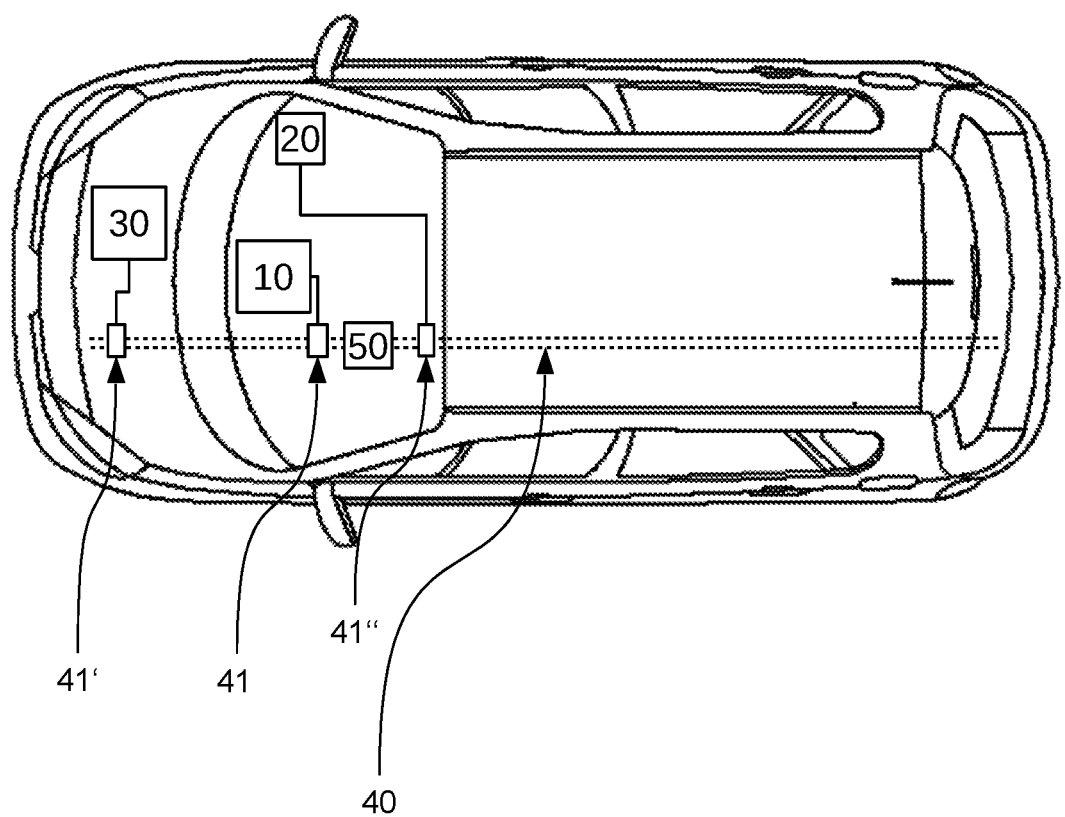
FIG. 1 shows a schematic view of a vehicle having a vehicle bus, wherein a few components, comprising a manipulation unit, are connected to the vehicle bus.

FIG. 1 shows a schematic plan view of a vehicle having the components that are essential to understanding the disclosure. The vehicle thus contains a vehicle bus 40, which may be for example a LIN bus or a CAN bus. Three bus participants are connected to the vehicle bus 40 via connections 41, 41', 41". An air conditioning control component 10 is thus connected to the vehicle bus 40 via the first connection 41, an auxiliary heater 30 is connected to the vehicle bus 40 via a second connection 41' and a ventilation device 20, for example having actuators in the form of a blower and/or of a flap setting device, is connected to the vehicle bus 40 via the third connection 41".

According to the disclosure, further participants may be connected to the vehicle bus 40. It is furthermore conventional in vehicles for other buses that perform dedicated tasks to exist in addition to the central vehicle bus 40. For this exemplary embodiment, it is assumed for the sake of simplicity that just one bus is required for the individual components to communicate.

A manipulation device 50 is installed in the vehicle bus 40.

Figure 2:
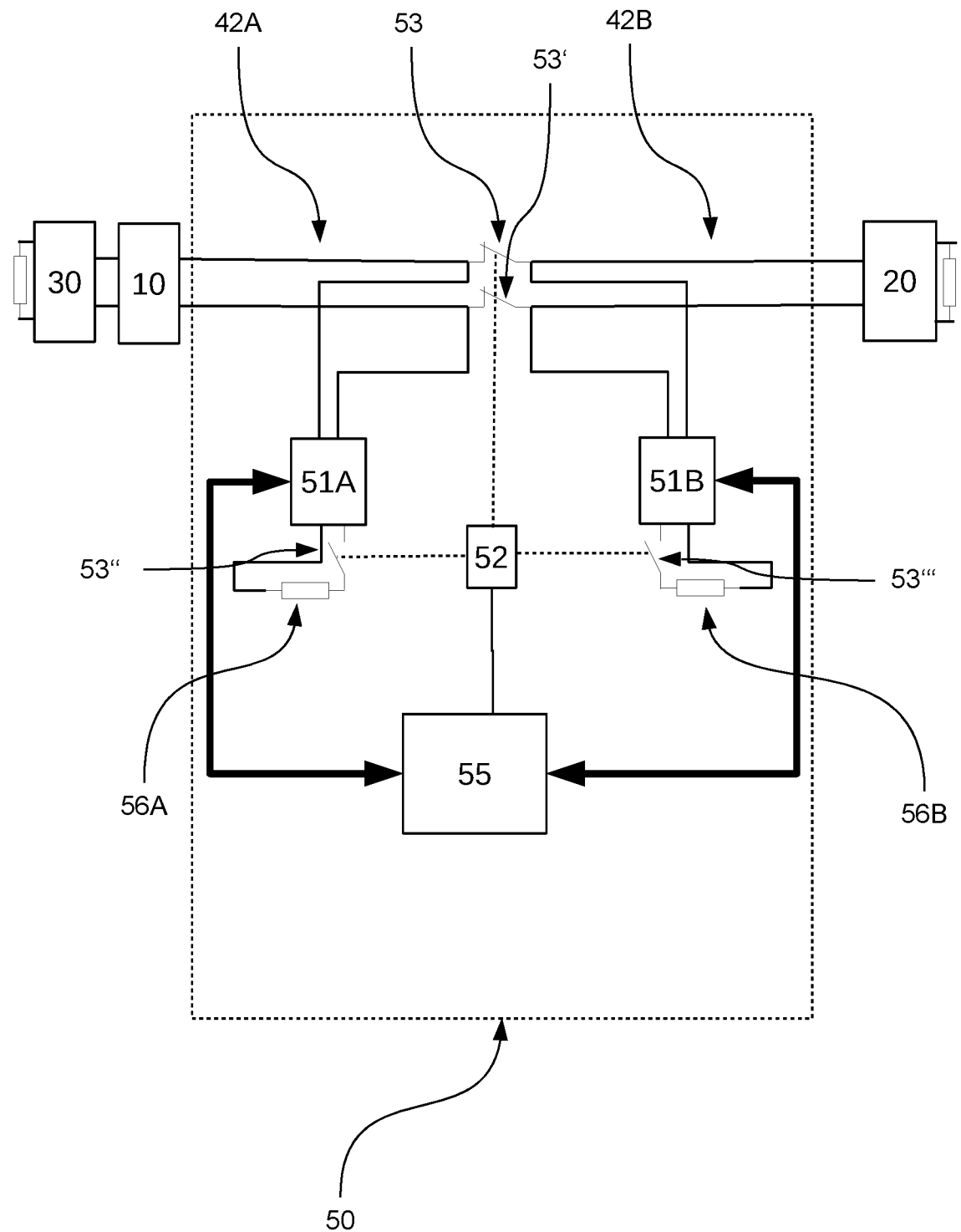
FIG. 2 shows the manipulation unit from FIG. 1 in a detailed view.

FIG. 2 shows the manipulation device 50 in detail. The manipulation device 50 ultimately interrupts the vehicle bus 40 and divides it into two subsegments, namely the first bus segment 42A having the air conditioning control component 10 and the auxiliary heater 30, and the second bus segment 42B having the ventilation device 20. The vehicle bus 40 is terminated to the left and to the right (see FIG. 2) by a schematically illustrated terminating resistor.

The manipulation device 50 comprises a processing unit 55 or a microcontroller, a first transceiver 51A, a second transceiver 51B and a relay. The relay is for its part able to be split into a relay actuation device 52 and into two normally open contacts 53, 53' and two normally closed contacts 53" and 53"'.

In the described embodiment, the transceivers 51A and 51B are continuously connected to the vehicle bus 40, wherein the first transceiver 51A is a participant of the first bus segment 42A and the second transceiver 51B is a participant of the second bus segment 42B.

In this respect, it is possible for the processing unit 55, by way of the first and/or second transceiver 51A, 51B, to receive the communication generally on the vehicle bus 40 and, following a division of the vehicle bus 40, on the bus segments 42A, 42B. The normally open contacts 53, 53' are arranged in the vehicle bus 40 such that they electrically interrupt the vehicle bus 40 when the relay actuation device 52 is activated and thus split it into the first and second bus segment 42A, 42B. At the same time, the relay actuation device 52 actuates the normally closed contacts 53", 53', such that the bus segments 42A, 42B are terminated by way of a terminating resistor 56A, respectively 56B.

It is thus possible for the processing unit 55 to divide the vehicle bus 40 and terminate it in orderly fashion by way of the relay, in particular by way of the relay actuation device 52. In other words, the processing unit 55 is able to switch back and forth between a first state (bus not interrupted) and a second state (bus interrupted). In the second state, the first bus segment 42A has the auxiliary heater 30, the air conditioning control component 10 and the first transceiver 51A as participants. The second bus segment 42B accordingly has the second transceiver 51B and the ventilation device 20 as participants.

As already described in the introduction, to effectively operate an stationary heating, it is necessary for example for control to be able to be taken over by certain actuators, for example the ventilation device 20. In the described exemplary embodiment, it is necessary to transmit a corresponding control command to the ventilation device 20 that does not originate from the air conditioning control component 10 that controls the ventilation device 20 during "normal operation".

The method according to the disclosure for taking over control may for example comprise the following steps:
1. Monitoring the vehicle bus 40;
2. Detecting bus inactivity on the vehicle bus 40;
3. Dividing the vehicle bus 40 by way of the relay;
4. Transmitting said control command to the ventilation device 20.

If it is thus assumed that the vehicle or the manipulation device 50 is in the first state (bus not interrupted), then the vehicle bus 40 may be monitored by way of the first transceiver 51A according to the disclosure. If it is necessary to take over control by way of the ventilation device 20, the processing unit 55 attempts to find a time at which bus inactivity is present. At this time, the relay actuation device 52 is activated, such that the vehicle bus 40 is physically divided into the two bus segments 42A, 42B. In this state, it is possible for the processing unit 55 to transmit control commands to the ventilation device 20 without the participants of the first bus segment 42A noticing this. The termination, already described, of the bus segments 42A, 42B furthermore allows the bus segments 42A, 42B always to be in a functional state.

In one exemplary embodiment, it is possible for the manipulation device 50 according to the disclosure to absorb control commands that are received in the second state by way of the first transceiver 51A and not to forward them to the ventilation device 20. The control command may likewise be acknowledged on the first bus segment 42A in this state, even though the control command has not actually been executed.

It is furthermore possible to receive control commands in the second state via the first transceiver 51A, to check them using the processing unit 55 and possibly to output them via the second transceiver 51B. In this case, the manipulation device 50 has the function of a repeater.

This functionality may be particularly expedient when the vehicle bus 40 has already been interrupted but it is not necessary to output dedicated control commands that originate from the processing unit 55. This function may likewise be helpful if for example it is no longer desired to perform heating by way of the auxiliary heater 30, but the two bus segments 42A, 42B have not yet been reconnected. By way of example, the air conditioning control component 10 may have been activated due to the vehicle being started and for its part attempt to transmit control commands to the ventilation device 20. In one exemplary embodiment of the disclosure, heating by the auxiliary heater 30 is interrupted in this state. The control commands of the air conditioning control component 10 may be forwarded "in unfiltered form" to the ventilation device 20.

In another exemplary embodiment, the manipulation device 50 will attempt to reconnect the vehicle bus 40 in this situation (air conditioning control component 10 is in an active state). According to the disclosure, this connection may be preceded by a monitoring phase in which the processing unit 55 waits for a particular event, for example bus inactivity. In this exemplary embodiment, the transceiver 51A may be used to detect the event. The processing unit 55 then deactivates the relay actuation device 52 depending on this event, such that the vehicle bus 40 is closed again. The terminating resistors 56A and 56B are preferably disconnected at the same time.

In one exemplary embodiment, the processing unit 55 is designed to detect or to interpret the type and effect of the control commands transmitted by the air conditioning control component 10 following activation thereof. By way of example, the air conditioning control component 10 may transmit control commands that prompt the ventilation device 20 to operate at 40% power. In actual fact, the processing unit 55 may however already have prompted the ventilation device 20 to operate at 60% power at an earlier time. In this state, the processing unit 55 may amend the control command of the air conditioning control component 10 such that, rather than increasing the power by 40%, the power is reduced by 20% on the part of the ventilation device 20.

Figure 3:
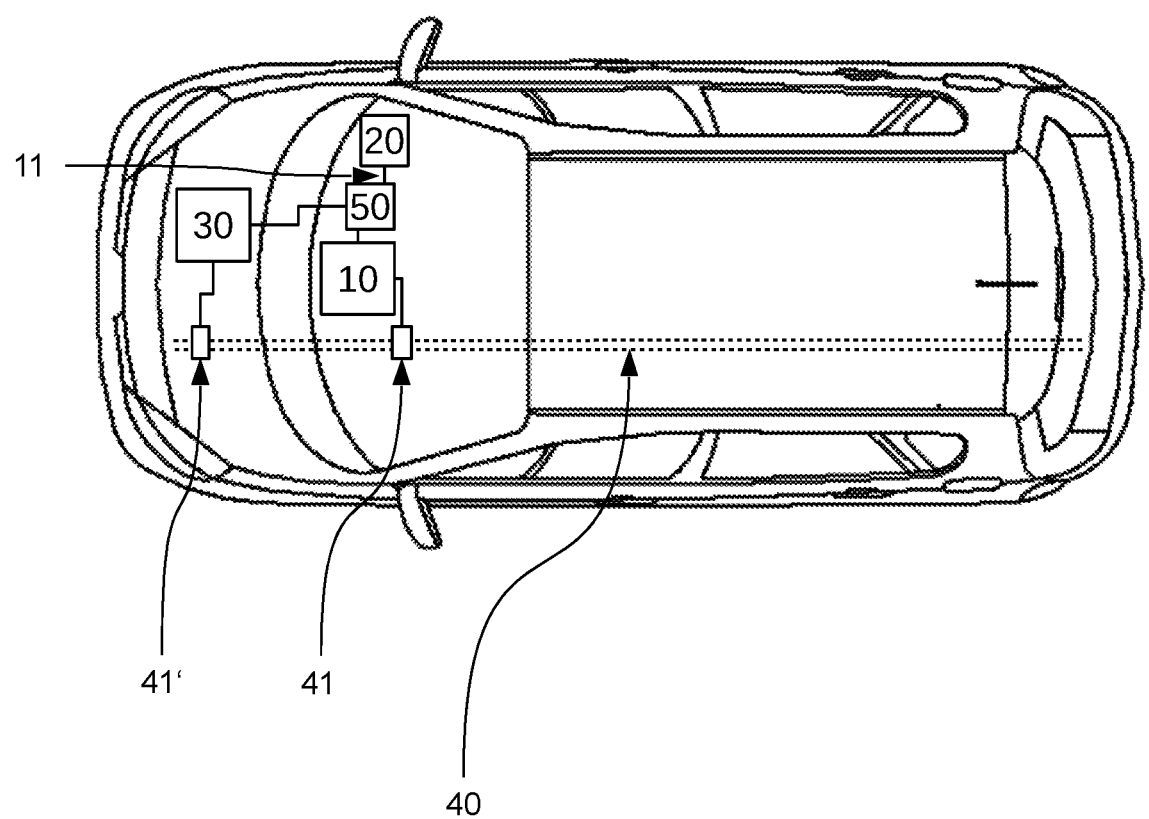
FIG. 3 shows a schematic view of a vehicle having a vehicle bus and having a LIN bus, wherein the manipulation unit is part of the LIN bus.

The described exemplary embodiments were based on a single vehicle bus 40. In reality, it is often the case that the air conditioning control component 10 is attached to the vehicle bus 40, wherein the air conditioning control component 10 and the ventilation device 20 possibly span a dedicated bus system with further actuators. According to the disclosure, the described manipulation device 50 may be used to divide this dedicated bus system and to take over control there, as already explained. FIG. 3 shows a corresponding exemplary embodiment, wherein the dedicated bus system is a LIN bus 11.

In one exemplary embodiment, it is necessary for the auxiliary heater 30 to communicate with the manipulation device 50. In the exemplary embodiments as have been explained with reference to FIGS. 1 and 2, corresponding communication takes place by way of the vehicle bus 40 or of the first bus segment 42A. In another exemplary embodiment, corresponding communication may take place via a separate bus system (cf. connection between the auxiliary heater 30 and the manipulation device 50 in FIG. 3).

In a (further) exemplary embodiment, the auxiliary heater 30 does not have a dedicated processing unit 55 and is activated by the manipulation device 50, for example by way of a relay.

According to the disclosure, the manipulation device 50 may be equipped with any desired inputs and outputs in order for example to interact with a user. The processing unit 55 may thus receive user inputs from the user that indicate for example that it is desired to perform heating by way of the auxiliary heater 30. The processing unit 55, using this exemplary embodiment, may take over all of the functions in order to implement corresponding heating 30.

In one exemplary embodiment, the described auxiliary heater 30 is a standalone heating unit. In variants of the disclosure, the auxiliary heater 30 may also be a cooling unit or a combined cooling and heating unit.

In the described exemplary embodiments, two transceivers 51A, 51B have been used in order to implement the disclosure. According to the disclosure, the first transceiver 51A may also be dispensed with provided that the vehicle bus 40 is intended to be monitored only when the vehicle bus 40 is interrupted.

In the described exemplary embodiments, the terminating resistors 56A, 56B have been coupled into the vehicle bus 40 at the same time as it is split. In one exemplary embodiment of the disclosure, it is not necessary to couple in corresponding terminating resistors since the bus does not require any terminating resistors for termination purposes or these are already provided as part of a component communicating on the bus. In one exemplary embodiment, the transceivers 51A, 51B comprise for example corresponding terminating resistors 56A, respectively 56B.

It is pointed out at this juncture that all of the parts described above, considered individually and in any combination, in particular the details illustrated in the drawings, are claimed as essential to the disclosure. Amendments thereto are familiar to those skilled in the art. A person skilled in the art is in particular easily able to combine the individual exemplary embodiments in any desired form.

LIST OF REFERENCE SIGNS

10 Air conditioning control component (HVAC)
11 LIN bus
20 Ventilation device
30 auxiliary heater
40 Vehicle bus
41, 41', 41" Connection
42A, 42B Bus segment
50 Manipulation device
51A, 51B Transceiver
52 Relay actuation device
53, 53', 53", 53''' Normally open contact or normally closed contact
55 Processing unit or microcontroller
56A, 56B Terminating resistor or termination resistor

The invention claimed is:

1. Method for transmitting at least one control command to at least one actuator in a vehicle, comprising the following steps:
   a) monitoring a communication bus;
   b) detecting an event that lasts longer than a predefined time interval;
   c) dividing the communication bus into a first bus segment disconnected from a second bus segment, wherein the actuator is part of the second bus segment;
   d) transmitting the at least one control command to the at least one actuator on the second bus segment, wherein while the first bus segment is disconnected from the second bus segment,
      in a forwarding phase, control commands are received on the first bus segment and output on the second bus segment; and/or
      in an absorption phase, at least one control command that is intended for the actuator is received and confirmed on the first bus segment, but is not output on the second bus segment.

2. The method according to claim 1, further comprising: connecting the first and second bus segment after performing step d) once or multiple times.

3. The method according to claim 1, wherein connection of the first and second bus segment is preceded by monitoring of the communication bus in order to detect an event, wherein a connection time is determined based on the detection of the event.

4. The method according to claim 1, wherein connection is preceded by a forwarding phase, wherein, in the forwarding phase, control commands are received on the first bus segment and output on the second bus segment.

5. The method according to claim 1, wherein the step of detecting an event comprises detecting bus inactivity.

6. The method according to claim 1, wherein connection is directly preceded by a forwarding phase, wherein, in the forwarding phase, control commands are received on the first bus segment and output on the second bus segment.

7. Computer-readable memory containing instructions for execution on at least one processing unit, wherein the instructions implement the method according to claim 1 when they are executed on the at least one processing unit.

8. Control unit, having at least one computer-readable memory and at least one processing unit, wherein instructions in the computer-readable memory implement the method according to claim 1 when they are executed on the at least one processing unit.

9. The control unit according to claim 8, comprising:
a first transceiver for connection to a first bus segment of a vehicle;
a second transceiver for connection to a second bus segment of the vehicle;
a processing unit, in particular a microcontroller, that is connected in terms of communication to the first and the second transceiver,
wherein
the processing unit is designed to monitor communication on the first and/or second bus segment and to activate a switching device based on the monitoring, wherein the switching device is designed to establish an electrical connection between the first bus segment and the second bus segment or to interrupt the electrical connection, and wherein the processing unit is designed, in a forwarding phase, to receive signals by way of the first transceiver and to output corresponding signals by way of the second transceiver.

10. The control unit according to claim 9, wherein the switching device is designed to establish the electrical connection between the first bus segment and the second bus segment in an unpowered state.

11. The control unit according to claim 9, wherein the control unit comprises at least one first termination resistor, wherein the control unit is designed to terminate the first bus segment by way of the first termination resistor at the same time as the interruption of the electrical connection.

12. The control unit according to claim 9, wherein the control unit comprises at least one second termination resistor, wherein the control unit is designed to terminate the second bus segment by way of the second termination resistor at the same time as the interruption of the electrical connection.

13. The control unit according to claim 9, wherein:
a first switch for terminating the first bus segment and/or
a second switch for terminating the second bus segment,
wherein the processing unit actuates the first or second switch in order to terminate the first, respectively second, bus segment in the event that the electrical connection is interrupted.

14. The control unit according to claim 9 wherein the switching device is a relay.

15. System, comprising:
a heating device; and
a control unit according to claim 8,
wherein the control unit is connected in terms of communication to the heating device, and interrupts the electrical connection in or before a heating phase of the heating device.

16. Vehicle, comprising a system according to claim 15.

* * * * *